Oct. 21, 1958  L. M. GOODRIDGE  2,856,910
FUEL INJECTION SYSTEM
Filed April 23, 1956  2 Sheets-Sheet 1

INVENTOR.
LAURENCE M. GOODRIDGE
BY
ATTORNEY

Oct. 21, 1958

L. M. GOODRIDGE 2,856,910

FUEL INJECTION SYSTEM

Filed April 23, 1956

INVENTOR.
LAURENCE M. GOODRIDGE
BY Bertram H. Mann

ATTORNEY

United States Patent Office 2,856,910
Patented Oct. 21, 1958

2,856,910

FUEL INJECTION SYSTEM

Laurence M. Goodridge, Clayton, Mo., assignor, by mesne assignments, to ACF Industries, Incorporated, New York, N. Y., a corporation of New Jersey Application April 23, 1956, Serial No. 579,958

15 Claims. (Cl. 123—119)

This invention relates to a system for feeding fuel under pressure to the combustion chambers of an internal combustion engine, and, more specifically, to a pressurized fuel metering system for proportioning the rate of fuel flow to the rate of air flow for proper combustion combined with a fuel distributing system for maintaining a proportional flow of metered fuel under pressure between a plurality of fuel nozzles.

Understanding of the present invention will, perhaps, be aided by a brief description of prior systems for proportioning the rate of fuel flow to the rate of air flow to an engine. The systems now in use for metering fuel under pressure come within one of two generally basic types.

In the speed-density systems, the rate of air flow is not directly measured; instead, an approximation is obtained by metering the fuel according to two engine variables—engine speed and manifold pressure. One objection to such a system is that density is not a true indication of air flow. Most engines have increasing, rather than decreasing, manifold suction in the initial speed range at light loads.

In the proportional flow systems, the pressure drop across a fuel metering restriction is held proportional to the pressure drop across an air metering restriction (venturi) in the air induction system of the engine, or the pressure drop across a variable area fuel metering restriction and the pressure drop across a variable area air metering restriction in the air induction system are both held constant while the areas of these restrictions are held proportional.

The aspirating type of carburetor does not meter fuel under pressure, but, nevertheles, it appears accurate to state that carburetors of both the air valve type and the plain tube type are, basically, proportional flow metering systems, and obviously perform very satisfactorily for that purpose within a limited range of air capacities imposed by fixed venturi structure. Any pressure system, in order to be competitive, must perform as well, but over a larger range.

It is an object of the instant invention to obtain the same results in variation of mixture ratio as obtained by a carburetor, but without the limitation as to air flow capacity range. This object is not obtained, to my knowledge, by present proportional flow devices metering fuel under pressure. Some limitation is present due to the use of a restriction for metering air flow.

To obtain this object requires an approach based upon a new and different concept. The usual procedure is to obtain from a particular engine the correct fuel ratio for variations in manifold pressure over the range of engine speed and plot the full-throttle and part-throttle curves according to this data. Instead of this procedure, it is proposed to obtain by tests data indicating the rate of fuel consumption of the engine over the entire speed range for each small increment of throttle setting from idle to full-throttle. From this data, a plurality of curves can be obtained by plotting the rate of fuel consumption, say in pounds per hour, against engine speed in R. P. M. for each throttle setting measured in either degrees of opening or percent.

This invention is based upon the concept that proper fuel metering is possible by a control responsive to the variables—engine speed and throttle opening. For example, fuel at a constant pressure head can be metered by a fixed orifice having a straight tapered needle positioned electrically, mechanically, or hydraulically, by an integrating device which senses these two variables—engine speed and throttle opening—so as to produce varying controlled rates of fuel flow according to each of the curves obtained. In order to do this, the integrator must be one producing a needle movement proportional to the ordinate of any point on any one of the curves as determined by a given throttle opening and by a given engine speed. An integrator responsive to electric signals produced by movements of the throttle and by engine speed will be described in detail hereinafter.

To obtain a constant pressure head, it is the usual procedure to combine a fuel pump and a pressure regulator. The pressure regulator contemplated has a valve opened by a certain pressure such as, for example, 25 pounds of fuel pressure acting against the resistance of a spring tending to close the valve. The valve is preferably a poppet type of valve opened by fuel pressure but including a metering restriction which requires considerable valve travel in order to produce a substantial increase in flow. The pressure regulator includes a solenoid energized from a battery through a vibrator giving a pulsating current. The solenoid, when energized by turning on the engine ignition, also resists opening movement of the valve. This resistance can be so calibrated as to require, say, another five pounds of fuel pressure in order to open the valve of the pressure regulator.

Downstream of the metering device are a plurality of injector nozzles, all of which are constructed in the same manner as this pressure regulator, and are connected to receive fuel from the metering device. The solenoids in each of the nozzles are energized from the same source of current as the solenoid in the pressure regulator, but there is an adjustable resistance in the electric circuit to all of the nozzles by which the closing force applied by the solenoids in each of the nozzles is maintained at a certain amount, which can be variable and is usually less than that imposed by the solenoid on the valve of the pressure regulator, so that the nozzles will open at a lower pressure than the pressure regulator, whereby a certain controlled pressure drop will be maintained across the metering device. Any variation in the fuel flow resulting from a pressure change in the differential across the metering device, or due to a difference in flow between the nozzles, will produce a change in position in one or more of the solenoid plungers and valves to unbalance the reluctance in the circuit, effecting a change in voltage to the solenoids to correct the unbalanced fuel flow condition. In this respect, each will function as a transducer in the circuit.

The above described system may be readily modified to provide a metering correction for air temperature or density by simple indicating means controlling the flow of current.

Further objects and advantages of the instant invention will become apparent from the reading of the detailed description, taken with the accompanying drawings, in which.

Figure 3:
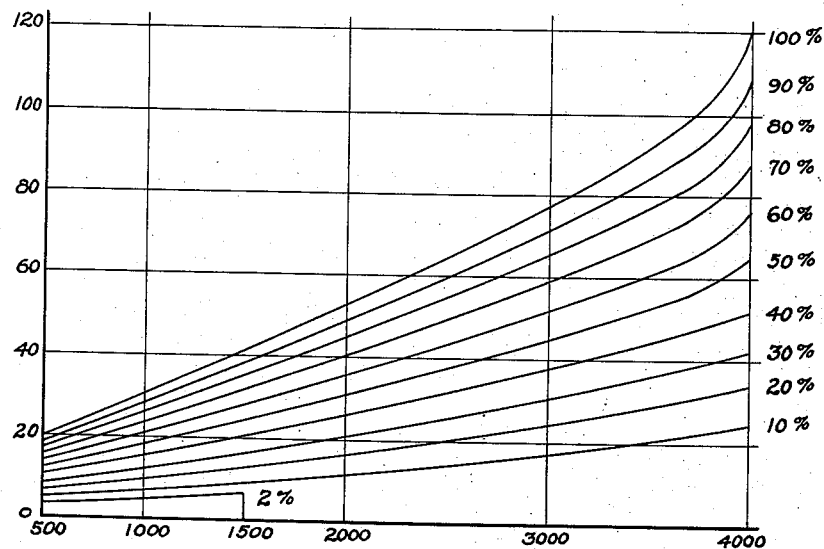
Fig. 3 is a chart illustrating a plurality of engine curves for fuel requirements of an engine.

In Fig. 3 are shown a set of typical engine fuel requirement curves. It should be understood that these curves will vary from engine to engine, and therefore must be obtained in each instance from the tests outlined above. The ordinates are in pounds of fuel per hour; the abscissa in engine R. P. M. starting with an idling speed of around 500. The curves indicate the fuel consumption for the percent of throttle opening. The lowest of the curves is for two percent throttle opening corresponding approximately with idle setting of the throttle. It will be noted that the fuel is entirely cut off above 1500 R. P. M., which is a desirable feature and one which cannot be obtained in a carburetor very easily.

The gist of the invention is a structure which will sense engine speed and throttle opening and, by integrating these two variables, produce a fuel metering corresponding with a point on any one of the curves as determined by these two variables.

Figure 1:
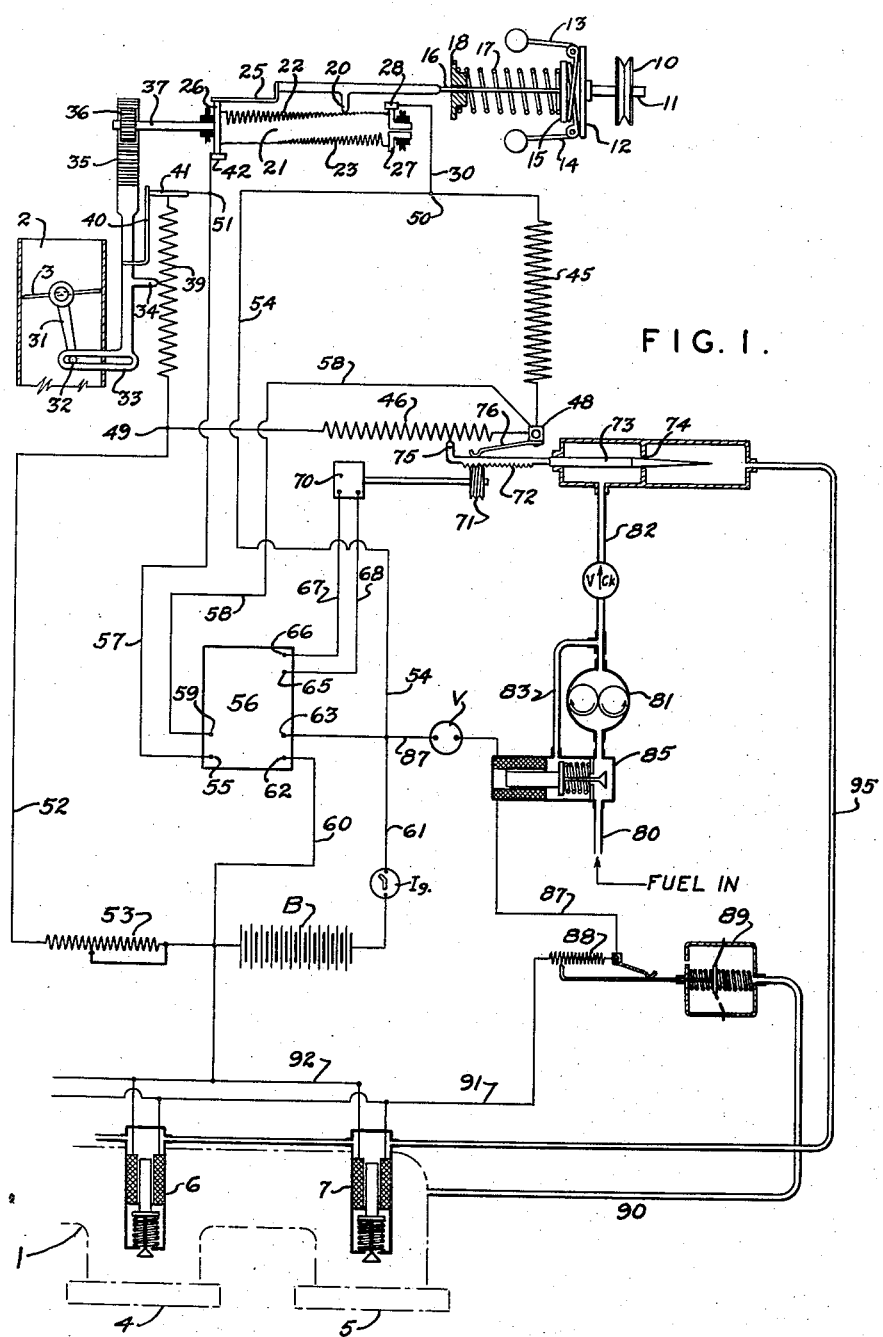
Fig. 1 is a schematic illustration of a system according to the present invention.

With reference to Fig. 1, schematically illustrated is an intake manifold 1 having an inlet 2 controlled by a manually operated throttle 3. The intake manifold 1 has a plurality of branches 4 and 5 which connect with the separate intake ports of an internal combustion engine (not shown). The particular engine and air induction system for the engine form no part of the present invention, and will therefore not be illustrated and described.

Suitably secured in the intake manifold branches 4 and 5 are individual injection nozzles 6 and 7. As hereinafter explained, the fuel is suitably metered in accordance with air flow, and distributed to the individual intake ports of the cylinders, in equal amounts, by the injection nozzles 6 and 7.

The metering system for the fuel, as has been explained above, is based upon the integration of two variables—engine speed and throttle opening. The engine speed may be suitably indicated by a governor-type of mechanism driven from the engine crankshaft by a V-belt engaging a pulley 10 on rotatable shaft 11. The governor device proper comprises a cross-piece 12 that is rotatably driven by the pulley 10 at engine speed or in proportion to engine speed. This cross-piece has pivoted thereto weighted arms 13 and 14, which will move outwardly due to the centrifugal effect produced by rotation. A slide contact 15 on rod 16 will be moved against the pressure of the spring 17 in proportion to the speed of rotation by the inner ends of the arms 13 and 14. The spring 17 has a fixed abutment 18 forming a spring seat. Rod 16, in turn, carries a sliding contact 20. The slider 20 rides on a rotatable carrier 21, upon which are mounted a plurality of resistance elements 22, 23, etc., which resistance elements are suitably calibrated to vary the voltage output passing therethrough by way of the sliding contact 20, which voltage will vary with changes in engine speed. A brush 25 on contact 20 rides on a slip-ring 26, which rotates with the resistance carrier 21. A split slip-ring 27 on the opposite end of the carrier 21 is connected, in turn, to each of the plurality of resistance elements mounted on the carrier, and is contacted by a brush 28 connecting the individual resistance elements with the remainder of the circuit through a lead 30. The electric circuit, therefore, is from the lead 30 through the brush 28 to the slip-ring 27, and thence through the resistance elements on the carrier 21 to the sliding contact 20 and brush 25 to slip-ring 26.

The throttle opening variable for controlling the system comprises throttle 3 in intake conduit 2, which throttle operates an arm 31 having a pin 32 riding within a scotch yoke 33. This mechanism will give a more or less linear relation between the motion of the sliding contact 34 and the percent of throttle opening. Arm 33 carries a rack 35 operating a pinion 36 on shaft 37 to rotate the resistance carrier 21 to different positions for each throttle opening, thereby selecting for slider 20 the particular resistance 22, 23, or other resistances suitable for the particular throttle opening.

Slider 34 rides in contact with a resistance 39, and has a brush 40 on wiping contact 41 which is connected to brush 42 in contact with slip-ring 26.

The resistance elements 39 and the resistance carrier 21 are connected, in turn, to a fixed resistance 45 and a variable resistance 46 and form therewith a Wheatstone bridge circuit including a terminal connection 48 between the resistances 45 and 46, a terminal connection 49 between the resistances 39 and 46, a terminal connection 50 between the resistance 45 and the resistance carrier 21, and a terminal connection 51 between the variable resistances 21 and 39.

Terminal 49 is connected by lead 52 to the positive side of a battery B through a variable resistance 53, which may be used to balance the Wheatstone bridge. The opposite terminal 50 is connected by way of leads 54 and 61 to the negative side of a battery B, thereby completing the circuit.

The terminal 51 of the bridge circuit is connected to one input terminal 55 of a converter amplifier device 56 by means of a lead 57, and the other terminal 48 of the bridge circuit is connected by way of a lead 58 to the other input terminal 59 thereof. The electrical potential of the battery B is applied to the amplifier tube filaments within the converter amplifier device 56 by means of conductors 60 and 61 connecting with terminals 62 and 63 of the said device 56. The output terminals 65 and 66 of the amplifier converter device 56 are connected by leads 67 and 68, respectively, with the suitable terminals of a reversing type electric motor 70 that is operable through a worm gear 71 and rack 72 to operate the straight tapered needle 73 within the fuel metering orifice 74.

The rack 72 of the valve 73 comprises one end portion of an elongated bar-like member carrying a sliding contact 75 riding on the resistance element 46 previously described. This sliding contact 75 is electrically connected to the bridge terminal circuit at 48 by means of a flexible brush 76.

Actuation of the bar 72 by the motor 70 to move the needle 73 will occur whenever the Wheatstone bridge circuit is unbalanced either by movement of the throttle which changes the resistance of the resistor 39, or a change in engine speed which operates the sliding contact 20 on one of a plurality of resistors on the resistance carrier 21. Whenever this occurs, however, the movement of the needle also moves the sliding contact 75 on the resistor 46 so as to rebalance the Wheatstone bridge circuit.

Thus, operation of the apparatus above described follows generally the principle of the Wheatstone bridge. [See, for example, "Wheatstone Bridge Charts for Transducer Circuits," by Wayne A. Ring, Product Design Handbook for 1956 (Product Engineering) published by McGraw-Hill.] The electric circuit thereof is arranged so that the voltage in the two arms of the bridge containing the variable resistance 39 and the fixed resistance 46 tends to remain balanced with the voltage in the other two arms of the bridge containing the variable resistances 22 and 23 and the fixed resistance 45, and hence the net voltage output across the bridge normally is zero. A change in either throttle position or engine speed, however, will unbalance the bridge electrically, so that the voltage across the resistances 46 and 39, for example, is less than that across the resistances 22, 23, etc., and 45. This voltage difference, being direct current, is fed to the amplifier converter 56, converted to alternating current, and then amplified by the device sufficiently to drive the motor 70 in an amount required to electrically rebalance the bridge by movement of the sliding contact 75 on the resistance 46. Thus, the needle 73 will take up a new position with each change in throttle opening and/or each change in engine speed.

If the throttle 3 is fixed in a set position, the proper one of the resistance elements 22 and 23 will be in contact with the slider 20, so that throughout the entire range of engine speeds the voltage variation in the Wheatstone bridge by the movement of the slider 20 will produce a direct movement of the needle 73 so as to vary the fuel flow rate in a manner corresponding to the proper curve shown in Fig. 3 corresponding to the percentage of throttle opening. All of these curves are similar but closely spaced except for the one illustrating the rate of flow for two percent of throttle opening, which is a condition of throttle setting for dead-idle. In this position, it is desirable for the engine to shut off the fuel completely at engine speeds above 1500 R. P. M. This can be obtained by a properly calibrated resistor such as 22 on the resistance carrier 21. It will be understood that this resistor can be a separate one, as can the others which correspond to 10, 20, 30, etc., percent of throttle opening. On the other hand, the resistance carrier 21 may be divided into resistance segments which progressively vary in resistance as the carrier is turned by movement of the throttle.

In order to obtain uniform metering from the metering device 73 and 74, it is important that the pressure drop across the orifice 74 be controlled. During ordinary power output conditions within most of the range of engine speeds, it is desirable that the pressure drop across the orifice will be maintained constant. Under other conditions, it is likewise important that compensation be made in the system for variation in manifold pressures, which will affect the total pressure drop from the several injectors 6 and 7.

Fuel is supplied to the metering device through a pipe 80 to an engine driven pump or the like 81, which, in turn, connects with a tube 82 supplying the upstream side of the metering orifice 74 with fuel under pressure. In the by-pass 83 around the fuel pump 81 is a pressure regulator generally indicated as 85 shown in enlarged view in Fig. 4, the specific construction of which will be described hereinafter. It is sufficient here to point out that the pressure regulator 85 has a valve structure arranged to be opened by increases in pressure in the by-pass line 83 so as to by-pass fuel back to the supply line 80. The valve, in turn, is urged closed against fuel pressure by a spring and also by the pull of a solenoid or transducer which receives its power from the battery B through a lead 87 containing the vibratory converter V which changes the direct current of the battery to a pulsating direct current or oscillating direct current.

The structure described operates to maintain a pressure in the line 82 which is a function of the voltage impressed on the solenoid in the pressure regulator 85 and its spring pressure.

The line 87 also connects with a variable resistor 88 operated by a suction motor 89 which has one side connected with the intake manifold by a pipe 90. The voltage output of the variable resistor 88 is impressed on each of the nozzle injectors 6 and 7 through a lead 91, which connects each of the injectors 6 and 7 in parallel. The electric circuit has a suitable ground connection 92 for each of the solenoids in the injector nozzles 6 and 7 to complete the circuit from one side of the battery through the oscillator V to ground. A fuel line 95 supplies fuel to each of the injector nozzles 6 and 7 from a source downstream of the metering orifice 74.

The fuel pressure, therefore, which is downstream of the metering orifice 74, is always a function of the flow of current in the circuit 91, 92 plus the spring pressure in each of the injector nozzles, in the same manner as the pressure upstream of the metering orifice 74. If, therefore, there is current fluctuation from the battery B, there will be no effect upon the pressure difference across the orifice 74, which always remains proportional to the difference in voltage impressed upon the pressure regulator 85 and the voltage impressed upon the solenoids or transducers in the injector nozzles 6 and 7 as adjusted by the variable resistance 88. The amount of resistance in the circuit to the injector nozzles 6 and 7 can be a function of manifold pressure as adjusted by the motor 89, so that, as suction increases in the manifold, the difference in the voltage between the lines 87 and 91 decreases, and vice versa. This compensates for change in manifold pressure acting on the exposed area of the valve 105 tending to increase the pressure drop across the metering device.

Likewise, every sudden fluctuation in manifold pressure will have a decided effect upon the amount of resistance 88, and therefore the difference in voltage between that impressed on the pressure regulator 85 and that impressed upon the injector nozzles 6 and 7. This effect will tend to increase the fuel flow from the injector nozzles 6 and 7 instantaneously on throttle opening, and vice versa.

The purpose of using a vibrator V in the circuit instead of a steady current is so that changes in valve position in the regulator 85 will vary the reluctance imposed on the circuit 87, 91 and 92 so as to vary the voltage impressed on the solenoids in the injector nozzles 6 and 7 to obtain a compensation responsive to pressure changes. In other words, sudden increases in pressure which produce a decided displacement in the opening direction of the pressure regulator valve increases the voltage in the circuit 91 and 92, and thereby the pressure downstream of the metering orifice 74 in proportion to the increase in pressure upstream. Thereby, a constant pressure drop across the orifice is maintained even if pump pressure increases temporarily. On the other hand, decreases in pump pressure will be reflected in an increase in reluctance in the solenoid of the pressure regulator 85, decreasing the current in the circuit 91 and 92, and thereby the force tending to close the valves of the injector nozzles, so that the pressure in the line 95 likewise increases in a proportional amount. Because of this feature, the same compensation will occur between the nozzles to obtain equal flow from each.

Figure 4:
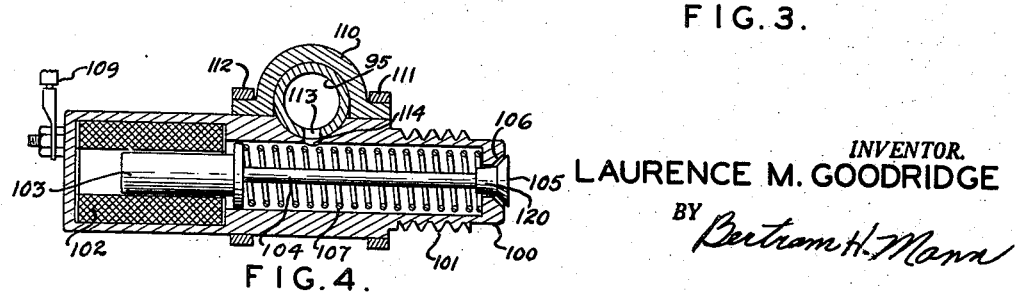
Fig. 4 is an enlarged detail view of the valve used in the pressure regulators and the injector nozzles.

In Fig. 4 is shown an injector nozzle construction which is deemed suitable for use in the instant invention. Each injector is in the form of a cartridge having an outer casing 100 threaded at 101 so as to be suitably fastened within a suitably threaded hole in the intake manifold of the engine. The casing 100 has a solenoid coil 102 in which is a reciprocating plunger 103. This, in turn, is mounted on a stem 104 carrying poppet valve 105 engaging with a seat 106 in the casing when closed. A spring 107 urges the poppet valve 105 onto its seat and maintains it there against fuel pressure. This pressure can be anywhere within the range of 20 to 50 pounds or more. Assuming that the spring 107 will retain the valve 105 seated against 25 pounds pressure, then the action of the solenoid, when energized through a connection 109, will increase the pressure necessary to open the valve by two to five pounds.

Fuel is supplied to the injector nozzle by a fuel line 95 which is secured to the casing 101 by clamp 110 held by rings 111 and 112, which may be adjustable clamping rings. Communication is established between the line 95 and the valve casing 100 by registering holes 113 in the tube and 114 in the valve.

Each valve 105 has a tapered metering restriction 120 so that substantial variations in flow produce substantial valve movement because, in effect, each coil 102 and plunger 103 functions as a well known type of transducer. (See "Movable and Fixed Core Motion Transducers," by A. E. Newton, Product Design Handbook for 1956, published by McGraw-Hill.)

In order to adapt the system to an internal combustion engine, it is necessary to de-energize the entire electrical circuit when the engine is turned off. In order to do this, lead 61 passes through the ignition switch IG so as to energize and de-energize the entire electrical system when the switch is turned on or off. Of course, when the ignition is turned off, each of the solenoids in the pressure regulator 85 and fuel nozzles 6 and 7 is de-energized. Nevertheless, the springs in each tend to retain the valve closed, so that the system, including the line 82 beyond the check valve CH and line 95, remains charged with fuel under at least 25 pounds pressure, or more, depending upon the basic spring setting in each regulator and injector. This feature avoids the formation of vapor bubbles due to the leakage of heat into the system.

Figure 2:
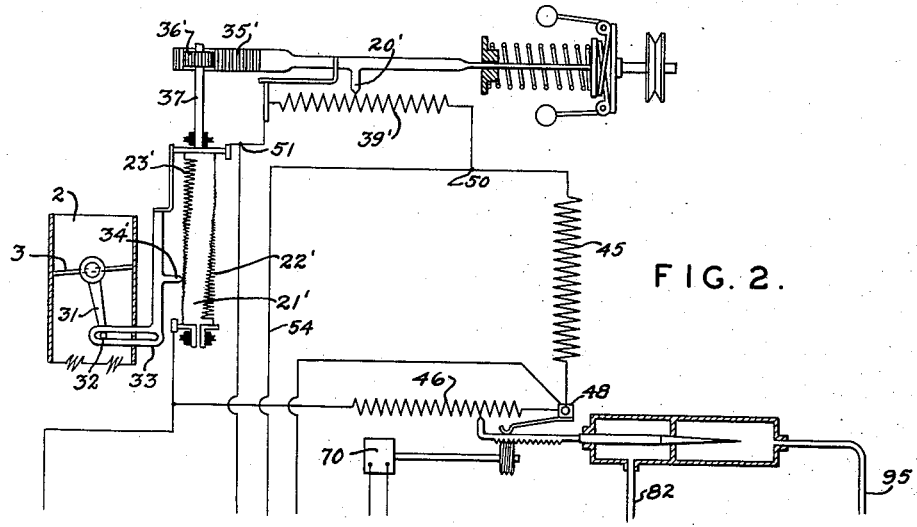
Fig. 2 is a schematic representation of a modified form of the invention.

Fig. 2 shows an alternative form wherein the position of the variable resistance 39 and the rotatable resistance carrier 21 have been reversed. In this modification, the slider 34' operates on the resistances 22, 23, etc., on the rotatable carrier 21'. The engine speed responsive device operates the slider 20' on a variable resistance 39', and the rack 35', which is now operated by the engine speed responsive device, rotates the carrier 21' through the pinion 36'. In other respects, the system is exactly the same as that heretofore described.

Fig. 2 operates in the reverse of the mechanism shown in Fig. 1. In other words, variations in engine speed produce rotation of the carrier 21' to select the proper resistance 22', 23', etc., for the slider 34'. Because of this change, it is necessary to reverse the connection of leads 57 and 58 to operate the motor 70 in the proper direction.

A structure has been described which will fulfill all of the objects of the present invention, but it is contemplated that other modifications will appear to those skilled in the art which come within the scope of the appended claims.

I claim:

1. In an engine charging device, an engine fuel charging system with an outlet in the air induction system of the engine, a fuel pump for pressurizing said fuel system, fuel metering means in said fuel charging system including a metering restriction and a pressure regulator means, an electric motor for operating said pressure regulator means, an electric control circuit having a connection with a source of electric power and said electric motor, and means controlling the flow of current in said electric circuit in response to variations in pressure in said fuel charging system and connected to operate said pressure regulator means.

2. In an engine charging device, an engine fuel charging system with an outlet in the engine air induction system, a fuel pump for pressurizing said fuel system, fuel metering means in said fuel system including a variable metering restriction and a pressure regulating means, an electric motor for operating said pressure regulating means, an electric control circuit having a connection with a source of electric power and said electric motor, and means in said fuel charging system controlling the current in said electric circuit in response to variations in pressure in said fuel charging system and connected to operate said pressure regulator means to maintain a selected pressure differential across said metering restriction.

3. In an engine charging device, an engine fuel charging system with an outlet in the air induction system of the engine, a fuel pump for pressurizing said fuel system, fuel metering means in said system including a variable metering restriction and pressure regulator means, an electric motor means for operating said fuel metering means, an electric control circuit having a connection with a source of electric power and said electric motor means, means in said electric circuit controlling the flow of current in response to changes in pressure in said fuel charging system, and means in said electric circuit connected with said engine for sensing variations in the rate of air flow through the engine air induction system.

4. In an engine charging device having an air induction system connected with the engine intake ports, and a fuel charging system with outlets for feeding fuel to the engine cylinders, the combination of a fuel pump for pressurizing said charging system to said outlets, fuel metering means in said circuit, pressure regulator means upstream of said fuel metering means, an electric motor for operating said pressure regulator, an electric control circuit having a connection with a source of electric power and said motor, and means controlling the current in said electric circuit in response to variations in pressure at said outlets in said fuel charging system downstream of said fuel metering means.

5. In an engine charging device having an air induction system with branches connected to the intake ports of the engine and a fuel charging system with discharge outlets in said air induction system, the combination of a fuel pump for pressurizing said fuel charging system to said discharge outlets, a fuel metering means including a valve in each of said discharge outlets, an electric circuit connected with a source of pulsating electric power, electric motor means for operating each of said valves energized from said electric circuit, and transducer means for sensing changes in fuel pressure in each of said fuel discharge outlets for controlling the flow of current in said electric circuit to equalize the fuel pressure at each valve and thereby equalize the flow from said discharge outlets.

6. In an engine charging device having a throttle controlled air induction system with branches connected to the intake ports of the engine and a fuel charging system with discharge outlets in said air induction system, the combination of a fuel pump for pressurizing said fuel charging system to said outlets, a pressure regulator for controlling pump output pressure, a metering restriction in said fuel charging system upstream of said outlets, valve means in each of said discharge outlets, an electric circuit connected with a source of pulsating electric power, electric motor means for operating said pressure regulator, electric motor means for operating each of said valves, a connection between said electric circuit and each of said electric motor means, and transducer means for sensing changes in fuel pressure upstream and downstream of said metering restriction for controlling the flow of current in said electric circuit to maintain a predetermined fuel pressure differential across said metering restriction.

7. The combination defined in the preceding claim in which the metering restriction is variable in flow capacity and said charging device includes an electric motor means for operating said variable metering restriction, a source of electric power for operating said electric motor means, an electric circuit between said source and said motor, and means in said circuit responsive to engine speed and throttle movement for operating said motor to vary the rate of fuel flow.

8. In a fuel metering device for an internal combustion engine, the combination of a fuel passage connected with the engine, a continuous flow type of metering device in said fuel passage, an air induction passage for said engine, throttle means operable to vary the flow of air through said induction passage, engine operated means operable to indicate the pumping capacity of the engine at various engine speeds, a mechanism connected between one of said means and said metering device for producing substantially linear response in said metering device in response to operation of said one means, a mechanism connected between the other of said means and said metering device for producing substantially linear response in said metering device in response to operation of said other means, and a connection between said means for changing the degree of linear response produced by said last mechanism.

9. In a fuel metering device for an internal combustion engine, the combination of a fuel passage connected with the engine, a continuous flow type of metering device in said fuel passage, a control for varying the rate of fuel flow through said device, an air induction passage for said engine, throttle means operable to vary the flow of air through said induction passage, engine operated means operable to indicate changes in the pumping capacity of the engine at various engine speeds, a servo-motor in said control for operating said metering device, a source of power, a connection between said source of power and said servo-motor, a mechanism in said connection operated by one of said means for producing a near linear response in said metering device in response to operation of said one means, a mechanism in said connection operated by the other of said means for producing a near linear response in said metering device in response to operation of the said other means, and a connection between said mechanisms for changing the degree of linear response produced by said last mechanism.

10. In a fuel metering device for an internal combustion engine, the combination of a fuel passage connected with the engine, a continuous flow type of metering device in said fuel passage, a control for varying the rate of fuel flow through said device, an air induction passage for said engine, means operable to vary the flow of air through said induction passage, means operable to indicate changes in the pumping capacity of the engine at various engine speeds, a servo-motor in said control for operating said metering device, a source of power, a connection between said source of power and said servo-motor, a mechanism in said connection operated by one of said means for producing a near linear response in said metering device in response to operation of said one means, a mechanism in said connection operated by the other of said means for producing a near linear response in said metering device in response to operation of the said other means, and a connection between said means for changing the linear response of said last mechanism.

11. In an engine charging system, in combination, an air passage having a plurality of branches serving the engine cylinders, a throttle means controlling the flow of air through said passage, a fuel passage having an outlet in each of said branches, a source of electric power, an electrically controlled valve means for regulating the flow of fuel from each of said outlets, means responsive, at least in part, to engine speed hydraulically connected to urge said valve means open, and means responsive to air pressure changes in said air passage downstream of said throttle valve connected between said power means and said electrically controlled valve means to urge each of said valves in a closing direction.

12. In a fuel metering system, the combination of a source of fuel under pressure, a fuel metering device, and a fuel pressure control for said metering device comprising pressure regulator means upstream of said metering device, an independent source of power for operating said regulating means, a connection between said source and said regulator means, and means in said connection for sensing changes in pressure downstream of said metering device for varying the power to said regulator means for proportional changes in pressure output therefrom to compensate for the pressure changes sensed.

13. In a fuel metering system, a source of fuel under pressure, a fuel metering device, and a fuel pressure control for said metering device comprising a pressure regulating means downstream of said metering device, an independent source of power for operating said regulator means, a connection between said source and said regulator means, and means in said connection for sensing changes in pressure upstream of said metering device for varying the power to said regulator for proportional changes in pressure output therefrom to compensate for the pressure changes sensed.

14. In a fuel metering device for an internal combustion engine, the combination of a fuel passage connected with the engine, a continuous flow type of metering device in said fuel passage, a control for varying the rate of fuel flow through said device, an air induction passage for said engine, means operable to vary the flow of air through said induction passage, means operable to indicate changes in the pumping capacity of the engine at various engine speeds, a servo-motor for operating said metering device operated by said control, a source of power, and means in said control between said source of power and said servo-motor including a balanced electric bridge circuit having two variable resistances, means for varying one of said resistances in response to operation of said means for varying the flow of air through said induction passage so as to unbalance said bridge circuit and operate said servo-motor to produce increases in flow through said metering device proportional to increases in air flow through said induction passage, means for varying the other of said resistances in response to operation of said means to indicate changes in the pumping capacity of the engine so as to unbalance said bridge circuit and operate said servo-motor to produce increases in flow through said metering device proportional to increases in the pumping capacity of the engine, and a connection between said two variable resistances to change the calibration of one by operation of the other.

15. In a fuel metering device for an internal combustion engine, the combination of a fuel passage connected with the engine, a continuous flow type of metering device in said fuel passage, a control for varying the rate of fuel flow through said device, an air induction passage for said engine, means operable to vary the flow of air through said induction passage, means operable to indicate changes in the pumping capacity of the engine at various engine speeds, a servo-motor for operating said metering device in said control, a source of power, and means in said control between said source of power and said servo-motor including a balanced electric bridge circuit having two variable resistance devices, one of which is calibrated for multiple responses, means for varying one of said resistance devices in response to operation of said means for varying the flow of air through said induction passage so as to unbalance said circuit and operate said servo-motor to produce increases in fuel flow through said metering device proportional to increases in air flow through said induction passage, means for varying the other of said resistance devices in response to operation of said means to indicate changes in the pumping capacity of the engine so as to unbalance said circuit and operate said servo-motor to produce increases in flow through said metering device proportional to increases in the pumping capacity of the engine, an electric connection between said means for varying the flow of air through said induction passage and one of said resistance devices, an electric connection between said means to indicate the changes in the pumping capacity engine at various engine speeds and the other of said resistance devices, and a mechanical connection between said means for varying the flow of air through said induction passage and said last named resistance device.

References Cited in the file of this patent

UNITED STATES PATENTS

| | | |
|---|---|---|
| 2,193,927 | Jivkovitch | Mar. 19, 1940 |
| 2,341,257 | Wunsch | Feb. 8, 1944 |
| 2,374,844 | Stokes | May 1, 1948 |
| 2,487,774 | Schipper | Nov. 8, 1949 |

FOREIGN PATENTS

| | | |
|---|---|---|
| 198,796 | Switzerland | Oct. 1, 1938 |
| 971,274 | France | July 5, 1950 |

OTHER REFERENCES

Serial No. 376,679, Fuscaldo (A. P. C.), published May 11, 1943.